UNITED STATES PATENT OFFICE.

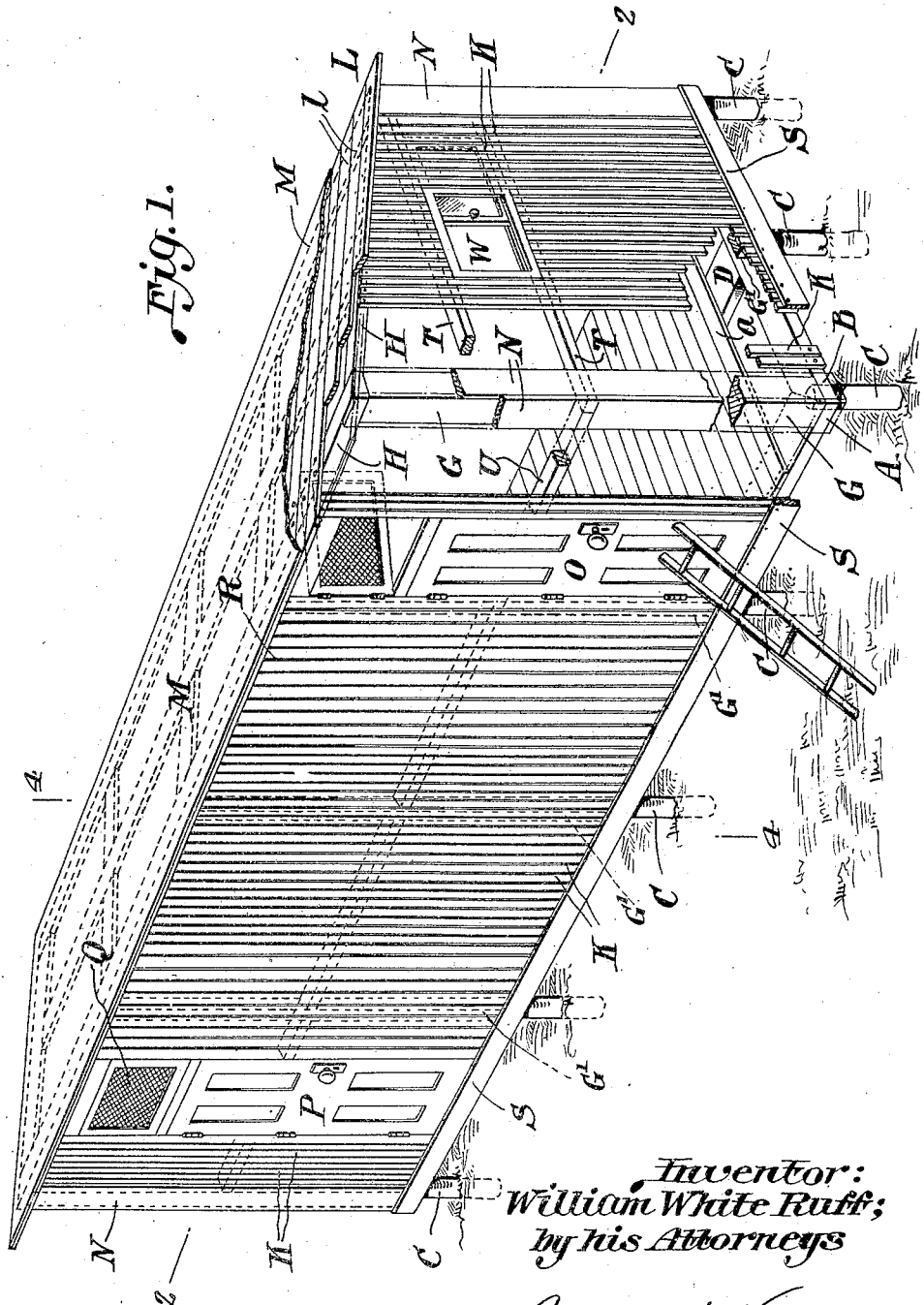

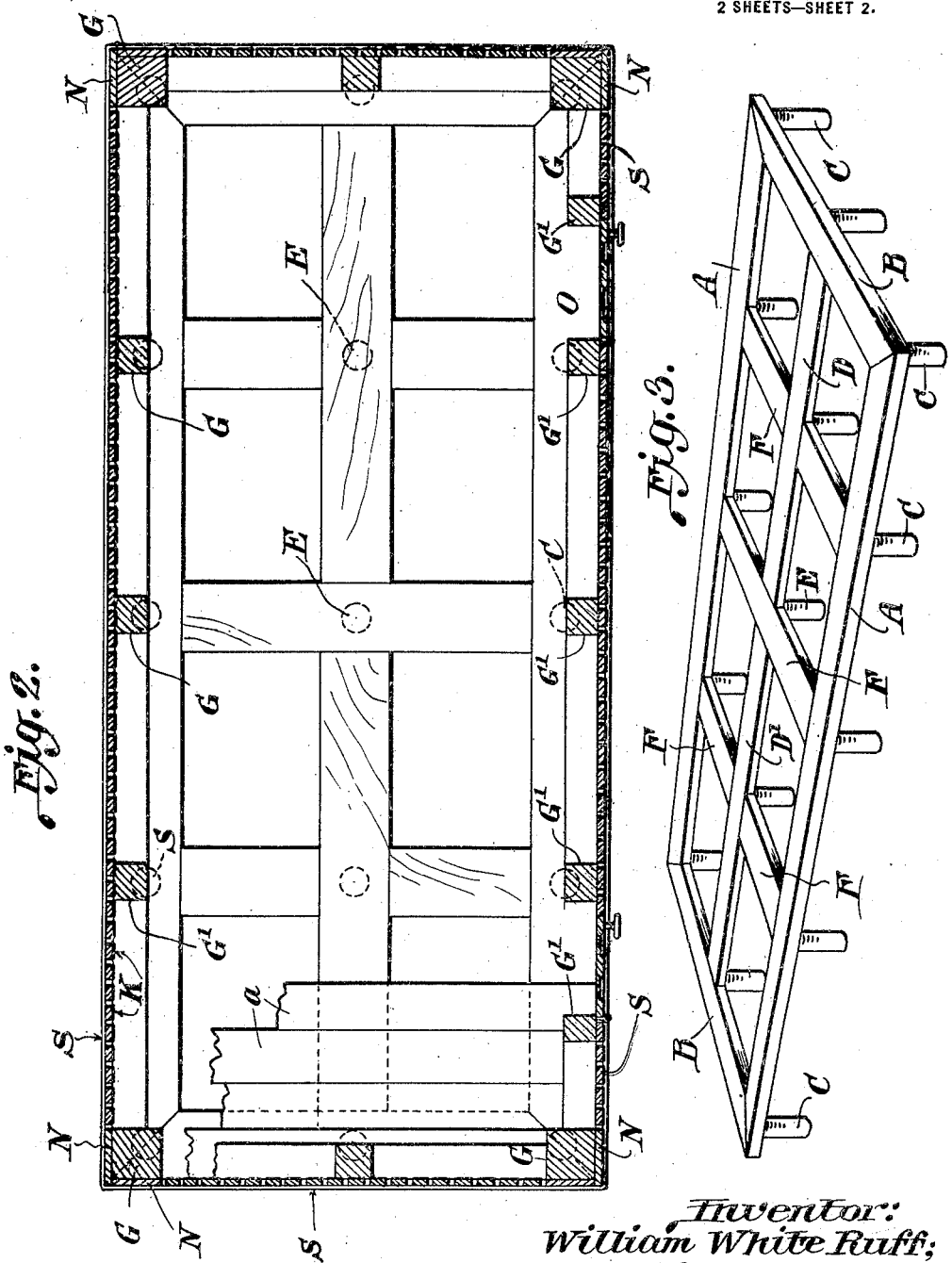

WILLIAM WHITE RUFF, OF LEXINGTON, VIRGINIA.

CORNCRIB.

1,363,273.  Specification of Letters Patent.  Patented Dec. 28, 1920.

Application filed September 9, 1920. Serial No. 409,191.

*To all whom it may concern:*

Be it known that I, WILLIAM WHITE RUFF, a citizen of the United States, residing in Lexington, in the county of Rockbridge and State of Virginia, have invented certain new and useful Improvements in Corncribs, of which the following is a specification.

This invention relates particularly to the construction of cribs or houses for storing corn, but my improvements may be embodied in like structures for storing other grain or other kinds of food.

Ordinarily corn houses or cribs are so constructed that rats, mice and other rodents have little difficulty in obtaining access to the interior of the house and to the grain. A large percentage of the grain is lost each year in this way and, furthermore, the remaining grain is often so polluted as to render it unsanitary and often it is polluted to such an extent as to cause it to spread disease which is sometimes extremely serious and often epidemic.

The object of my invention is to so construct a corn house that rats, mice and other rodents are entirely excluded.

In carrying out my invention I mount the sills of the sub-structure on posts, and these sills are of such width that the rodents cannot, after climbing the posts, pass around them or in any way obtain such a footing that they can gnaw the flooring of the structure. Instead of resting joists for the floor on the sills, I associate with the sills cross pieces which are disposed in the same horizontal plane with the sills and I secure the floor boards thereto. By this construction it is impossible for the rodents, after climbing the posts, to get any farther or to obtain such a footing that they can gnaw their way through the floor boards.

In the accompanying drawings:—

Figure 1 is a perspective view of a corn house embodying my improvements with parts broken away in order to illustrate certain details of construction.

Fig. 2 shows a horizontal section on the line 2—2 of Fig. 1.

Fig. 3 is a perspective view of the base or sub-structure of the house showing how the sills and cross pieces are connected and how they are supported on the posts.

The house or crib as a whole is designed to be substantial in construction, to provide necessary ventilation, and to effectively exclude rats, mice and other rodents.

As shown in Fig. 3 the longitudinal and side sills A and B of the sub-structure are arranged in the same horizontal plane and are supported by posts C. A centrally arranged sill made in section D, D' is supported on posts E and cross pieces F are also supported on posts, as clearly shown in Fig. 3. The sills and cross pieces are all in the same horizontal plane, they are securely connected with each other, and the whole structure is firmly supported on the posts. It will be observed by reference to Fig. 2 that the sills are considerably wider than the posts. This is a feature of vital importance. Were the sills narrow, the rodents could climb the posts, pass around the outside of the sills and gnaw the floor of the house, but I make the sills so wide that this is impossible.

The sills and cross pieces are covered by a flooring consisting of boards $a$ fitted tightly together and secured to the sills and cross pieces. The posts are sunk into the ground as indicated in Fig. 1.

At each corner of the crib there is a vertical corner post G supported on the sub-structure over a post C, and there are also intermediate posts G' supported over the remaining posts C. The front corner posts and front intermediate posts are somewhat longer than the rear ones (Fig. 1) and they are connected by top plates H which are suitably inclined at their upper sides as shown and are securely joined to the tops of the corner posts and intermediate posts. Horizontal girders T are provided at the sides of the crib and similar girders U are provided at the front and back to give stability to the structure. The front and rear sides of the crib, as well as the ends thereof, are covered by slats K which are suitably spaced to provide the necessary ventilation. The ends of the slats are attached to the top plates H and to the sills A and B and these slats are also secured to the girders T and U. Sliding windows W may be provided for ventilating purposes and also to provide a way in which corn may be thrown into the crib when desired, without opening the doors.

In order to provide a roof, I construct a sheathing L of boards $l$ which are secured to the top plates and these boards are covered with galvanized iron or other suitable roofing material M. The corner posts may be faced with frame plates N as shown.

Preferably the crib or house is rectangle in form and is provided with two doors O and P. Over one of these doors I provide a ventilating screen Q which may be permanently attached to the front of the house, and over the other door I provide a hinged screen R.

Around the lower portion of the crib I secure a skirting S preferably made of galvanized iron. This skirting is secured to the crib outside the lower ends of the slats K and is for the purpose of excluding mice.

Practical experience has demonstrated that the corn house or crib constructed as shown is most efficient. It is customary and perhaps necessary to erect a crib on posts for ventilating purposes and also to some extent to deter the entrance of rodents to the house, but I have found that rodents can climb such posts and where narrow sills are mounted on the posts and these sills support joists covered by the flooring, that the rodents can, after climbing the posts, pass around the narrow sills, find their way to the top of the sills, and there remain while they gnaw their way through the comparatively thin floor. I have remedied this defect in a very simple way, namely, by making the sills so wide that the rodents cannot pass from the post around them, and by dispensing with the usual joists and placing cross pieces between the sills and arranging them in the same plane therewith.

I claim as my invention:

A crib, comprising posts, sills mounted on the posts and which are of considerably greater widths than the posts, cross pieces associated with the sills supported by the posts and arranged in the same plane as the sills, and flooring secured to the sills and cross pieces.

In testimony whereof, I have hereunto subscribed my name.

WILLIAM WHITE RUFF.